W. S. BICKLEY.
TESTING APPARATUS.
APPLICATION FILED JAN. 4, 1910.
987,609.
Patented Mar. 21, 1911.
3 SHEETS—SHEET 1.
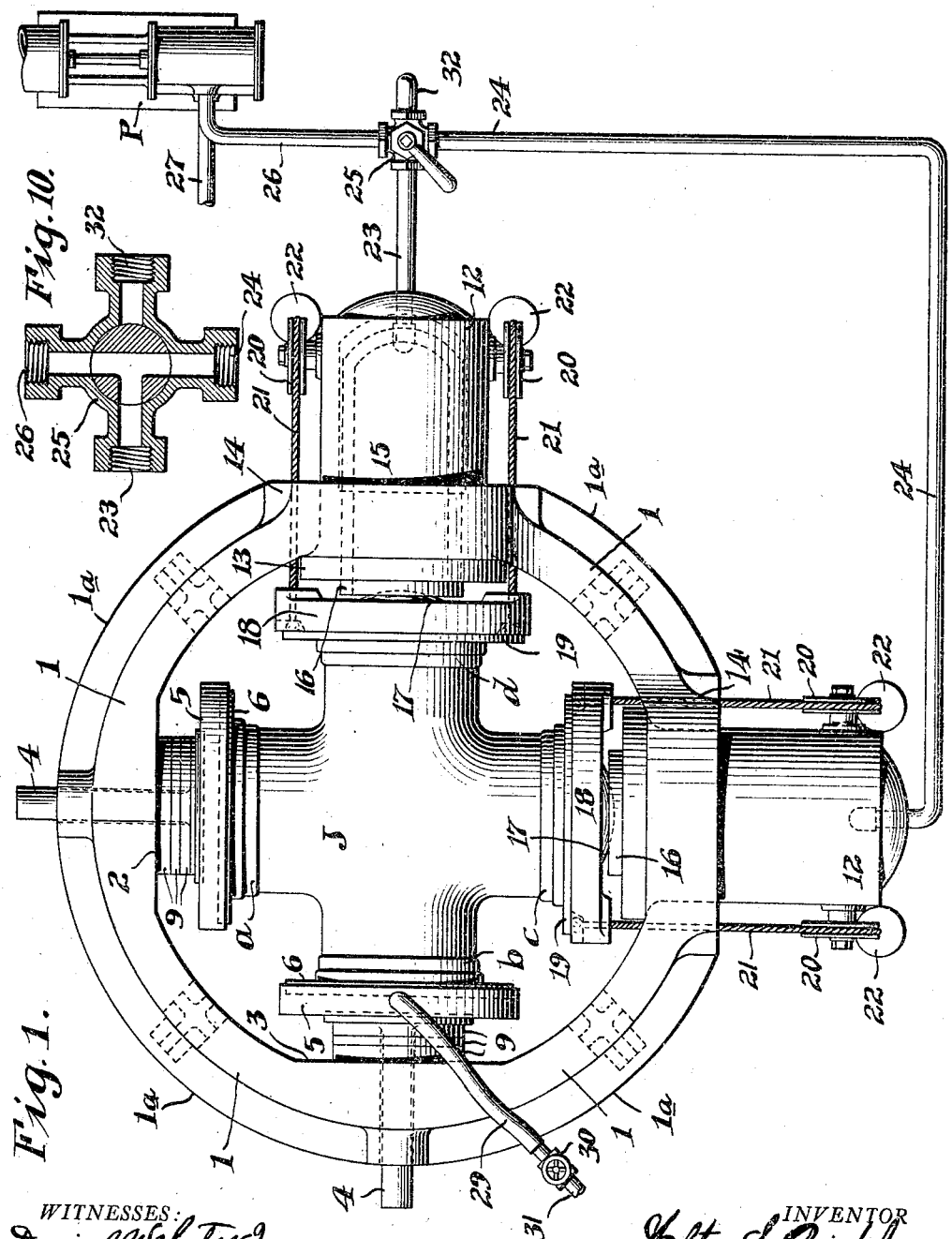
WITNESSES:
Daniel Webster, Jr.
Anna E. Steinbock
INVENTOR
Walter S. Bickley
BY
Cornelius L. Ehret
ATTORNEY.

W. S. BICKLEY.
TESTING APPARATUS.
APPLICATION FILED JAN. 4, 1910.
987,609.
Patented Mar. 21, 1911.
3 SHEETS—SHEET 2.
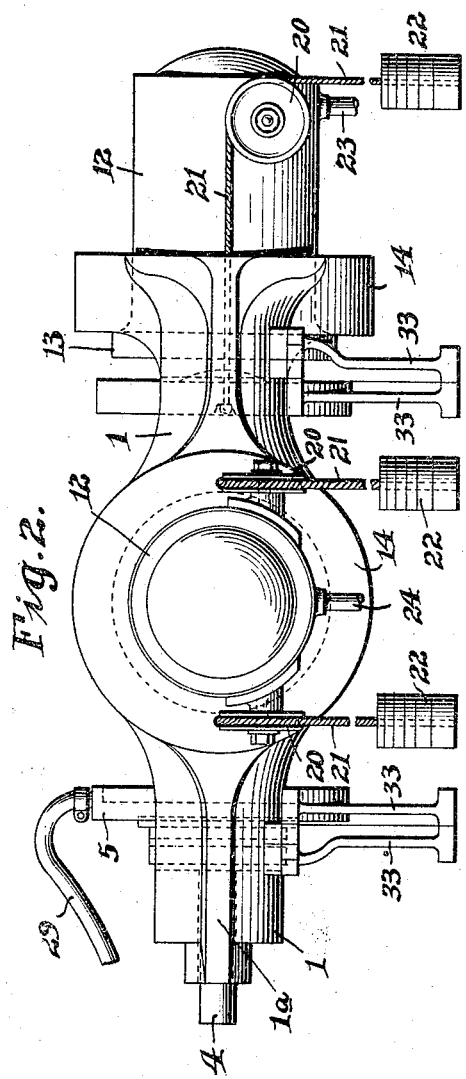
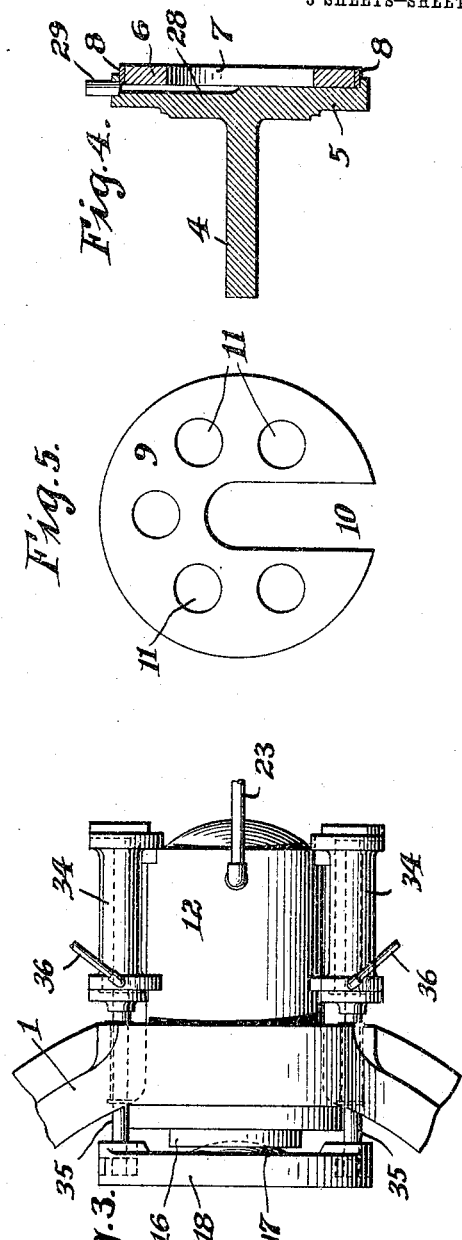
WITNESSES:
Daniel Webster, Jr.
Anna E. Steinbock
INVENTOR
Walter S. Bickley
BY Cornelius D. Ehret
his ATTORNEY.

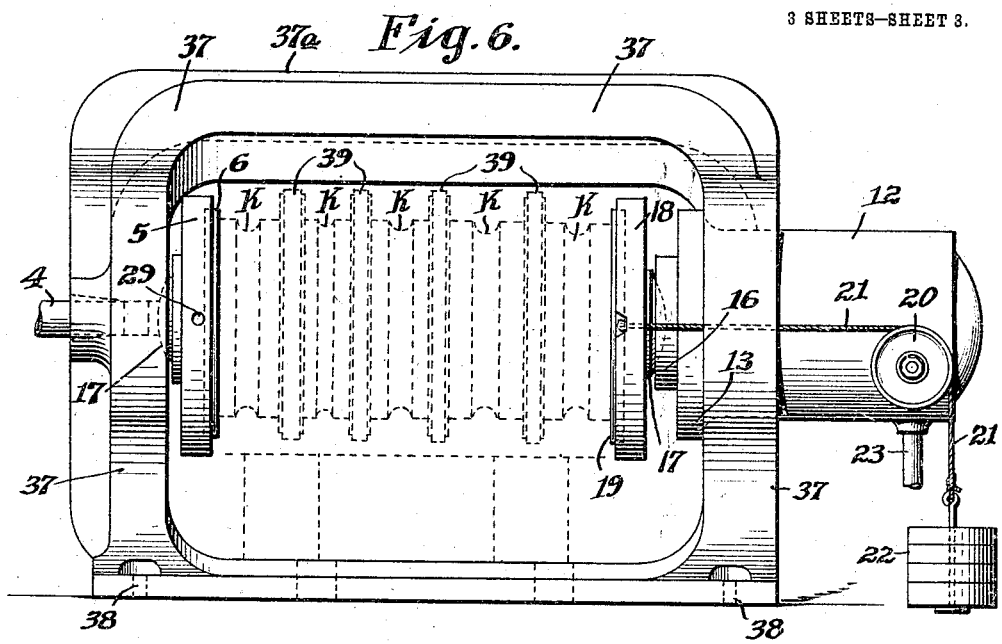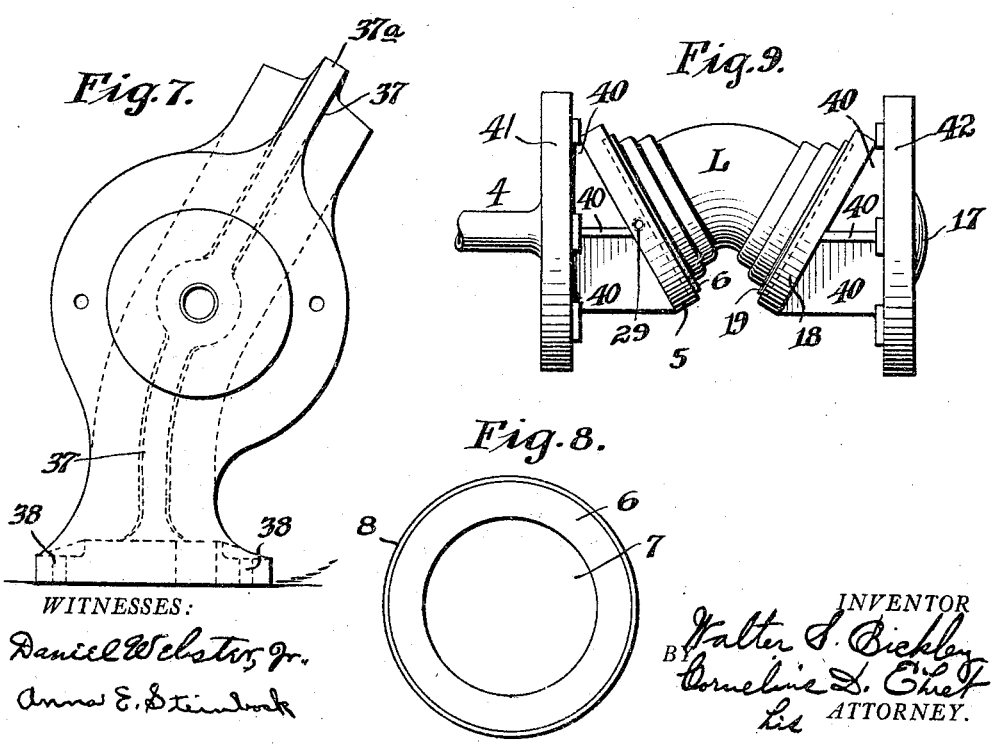

UNITED STATES PATENT OFFICE.

WALTER S. BICKLEY, OF CHESTER, PENNSYLVANIA, ASSIGNOR TO PENN STEEL CASTING AND MACHINE COMPANY, A CORPORATION OF PENNSYLVANIA.

TESTING APPARATUS.

987,609.   Specification of Letters Patent.   Patented Mar. 21, 1911.

Application filed January 4, 1910. Serial No. 536,250.

*To all whom it may concern:*

Be it known that I, WALTER S. BICKLEY, a citizen of the United States, and resident of the city of Chester, in the county of Delaware and State of Pennsylvania, have invented certain new and useful Improvements in Testing Apparatus, of which the following is a specification.

My invention relates to testing apparatus and particularly to apparatus for testing vessels, pipes, or other containers subjected to gaseous, fluid or liquid pressures.

My invention resides in apparatus for holding during test a member or members to be tested, such as pipe joints, couplings, unions, crosses, elbows, etc., or any other suitable vessel or device, and relates particularly to such apparatus for testing under high fluid, liquid or gaseous pressure large pipe couplings, joints, unions, crosses, elbows, etc., made of cast iron, cast steel or other material.

My invention resides in testing apparatus of the character above referred to and comprises a frame or housing having associated therewith a cylinder in which is exerted suitable pressure for moving a piston to clamp within the frame the vessels, pipes joints, unions, etc., or other devices to be tested; and means are provided for subjecting the vessels, pipe joints, unions, etc., to fluid, gaseous or other pressure while so held firmly in the testing frame.

Merely by way of example, it is stated that my invention is applicable to testing vessels, pipe joints, unions, etc., to be used with pipe lines subjected to high gaseous or hydraulic pressures. But obviously, as will hereinafter appear, my invention is applicable also to tests for other purposes and upon other devices.

For an illustration of some of the forms my invention may take, reference is to be had to the accompanying drawings, in which:

Figure 1 is a top plan view of one form my testing apparatus may take. Fig. 2 is a side elevational view of the same. Fig. 3 is a top plan view of a modified form of pull back or retracting apparatus. Fig. 4 is a longitudinal sectional view of a rest piece provided with means for communicating pressure to the vessel or other device under test. Fig. 5 is a plan view of a distance piece. Fig. 6 is a side elevational view of a modified form of my testing apparatus. Fig. 7 is an end elevational view of the same. Fig. 8 is a plan view of a wooden or other buffer or block suitable for use in my apparatus. Fig. 9 is a side elevational view of modified rest pieces suitable for testing pipe elbows or joints of certain types. Fig. 10 is a cross sectional view of a form of valve that may be used in my apparatus and system.

Referring to Fig. 1, J is a pipe cross, coupling or joint, for example, of cast metal, such as steel, having the four pipe openings $a$, $b$, $c$ and $d$. When it is desired to test such a joint or coupling to determine whether it will stand the pressures to which it is destined to be subjected in use, it is placed in the position shown in the testing apparatus which comprises the housing or girder ring member 1, having the stiffening rib 1$^a$, preferably of cast metal, provided with the bosses 2 and 3 to form supports for the coupling ends $a$ and $b$, respectively. The housing or frame or ring 1 forms preferably a closed figure of preferably solid or integral material, particularly in an arrangement such as shown in Fig. 1 where a plurality of pressure devices exert pressures upon the test piece in different directions.

Extending through the bosses 2 and 3 and the ring 1 are openings adapted to receive the stems 4 of the rest pieces 5, 5. The inner face of each rest piece has a depression which is adapted to receive block 6 of hard wood or other yielding or compressible material suitable for making a temporary tight joint. Such rest piece with wood block is shown in longitudinal section in Fig. 4 and a block is shown in Fig. 8, the same having an opening 7 and a circumferential strengthening band or hoop 8. Against these blocks 6 engage the ends $a$ and $b$ of the cross such as shown in Fig. 1, and between the backs of the rest pieces 5, 5 and the bosses 2 and 3 are placed the distance pieces 9, such as shown in Fig. 5. These distance pieces may be of metal, such as cast iron, or other suitable material, and are provided with a slot 10 for straddling the stems 4, and may be provided with perforations or other openings 11 for rendering the distance pieces lighter in weight.

Opposed to the boss 3 is the cylinder 12 which has a forward flange 13 adapted to rest against the housing or inside of the ring 1, the cylinder extending through the ring 1 and the boss 14 thereon. Within the bore of the cylinder is a piston 15 having the end 16 provided with a depression to receive the projection 17 on the rest 18 between which and the pipe receiving end $d$ of the cross or pipe joint or coupling J intervenes a wooden or other suitable block 19. The projection 17 may be spherical in shape or take other suitable form so as to allow the rest piece 18 to pivot or accommodate itself to the pipe receiving end $d$ to engage the same throughout its entire end surface, the block 19 being in this case unperforated if desired. Supported upon the cylinder 12, or otherwise suitably supported, are two sheaves or pulleys 20, 20 over which extend the ropes 21, 21 each secured at one end to the rest piece 18 and at the other end to the weight 22. And opposed to the boss 2 is a second cylinder 12 with associated apparatus as above described.

The wooden blocks 6, 19, and 19 may all be unperforated, except the block 6 at the left of Fig. 1 which must be perforated to allow communication with the interior of the device J.

Connected with the interiors of the cylinders 12, 12 are pipes 23 and 24 communicating through the valve 25, such, for example, as shown in cross section in Fig. 10, with the pipe 26 leading to a suitable pump P such as an air or hydraulic pump, the inlet to the pump being represented by pipe 27. And in the rest piece 5 associated with boss 3 is provided a channel 28, as seen in Fig. 4, which communicates with the flexible high pressure hose or other conduit 29 which, in turn, communicates through valve 30 with the pipe 31 leading to a hydraulic pump or air or gas pump, or any suitable pressure creating means.

The operation is as follows: The cross or other pipe joint or coupling or other vessel J is placed within the ring 1 and the valve 25 thrown to the position shown in Fig. 10, whereupon air or water under pressure is forced by the pump P through the pipe 26, valve 25, and through pipes 23 and 24. This causes a pressure on the rear ends of the pistons 15, 15 of the cylinders 12, 12 forcing them forward and transmitting pressure through the members 16, 16 and the rest pieces 18, 18 against the pipe ends $c$ and $d$ of the vessel or coupling J, thus forcing the same snugly against the opposing wooden blocks 6, 6 backed by the bosses, distance pieces and ring. This pressure may be made as great as desired, and in any case holds the member J firmly in position, and the blocks 19, 19 and 6 at the pipe ends $a$, $c$, and $d$ completely close the openings. Thereafter the valve 30 is opened and gas, fluid or liquid under pressure flows through flexible conduit 29 and through the channel 28 through the perforation 7 in the wood block 6 at the left, as shown in Fig. 1, into the interior of the device J, filling the same completely, the air first being allowed to escape if desired. The vessel J being thus held in position is submitted to whatever pressure may be desired, as, for example, the pressure necessary to determine whether the cross or other pipe coupling or union or vessel J is perfect. If any defects exist, they will become apparent under such test under the pressure supplied by the pipe 31. At the conclusion of the test the valve 30 may be closed, and the valve 25 rotated in a counter clockwise direction, as viewed in Fig. 10, through 90 degrees, whereupon the interiors of the cylinders 12, 12 are in communication with the outlet or drain pipe 32. The weights 22, 22 then descend and pull outwardly upon the ropes 21, 21 and force the pistons 15, 15 backward in the cylinders 12, 12 and in so doing force out the air or water through the drain or outlet 32. The member J is by this time released from pressure and can be removed from the testing apparatus.

As viewed in Fig. 2, the ring 1 and associated apparatus may be suitably supported by brackets or standards 33.

In place of the sheaves 20, 20, ropes 21, 21, weights 22, 22 as a return or retracting device, an arrangement such as shown in plan in Fig. 3 may be used. Here two cylinders 34, 34 are mounted upon each main cylinder 12 and are provided with piston rods 35 which connect with the rest member 18 and within the cylinders 34, 34 with piston heads. At the front ends of the cylinders 34, 34 are ports connected with pipes 36, 36 which may lead to the pump P or other source of pressure through a suitable valve. When it is desired to unclamp the device J under test, the valve 25 is operated as heretofore described, and then the valve or valves in pipes 36, 36 are opened to admit fluid or liquid under pressure to force the pistons outwardly, thus pulling the rest members 18, 18 outwardly and unclamping the device J.

In Figs. 6 and 7 I have shown a modified form of my apparatus suitable for testing a plurality of simple pipe couplings or other vessels or devices K, K. Here a suitable housing or frame 37, having stiffening rib 37$^a$, and corresponding with the ring 1 of Fig. 1, is provided and may be fastened to the floor or other suitable base at 38, 38. At its one end it is provided with a cylinder 12 and rest piece 18 operated by the piston thereof. Opposite the cylinder 12 is provided a rest piece 5 as hereinbefore described, provided with an inlet 29 in conmunication with air, gas or fluid under pressure, the frame 37 being provided with a depression to receive the spherically shaped projection 17 to allow the parts to adjust themselves accurately to the devices K, K. A plurality of devices K, K are assembled on a suitable board or rack with blocks of wood or other suitable material 39 intervening between neighboring devices K, K each block 39 being provided with a perforation so that when placed in the apparatus as shown in Fig. 6, the interiors of all the devices K, K are in communication with each other. Upon admitting pressure from the pipe 23 to the cylinder 12 the piston advances and clamps all the devices snugly against the rest 5 in the position shown in Fig. 6. Then air, gas, fluid or liquid is admitted under pressure through the pressure pipe 29 and the devices subjected to test as described in connection with Fig. 1. As seen in Fig. 7 the frame 37 has its upper portion deflected to one side so that a crane or other transferring device bearing the board or crate, having placed thereon the devices K, K and their separating blocks 39, 39, may lower the same downwardly into position, without engaging any part of the frame.

As seen in Fig. 9, the pipe coupling or joint L having its ends at an angle to each other as shown may be subjected to test. Here the rest pieces 5 and 18 are supported by webs 40 integral with or upon the members 41 and 42 respectively. The member 41 has a stem 4 to extend through the frame 37 or other frame such as a ring 1 of Fig. 1. And the member 42 has the pivotal bearing projection 17 against which pressure is exerted by a cylinder such as 12. When in position a block or brace may be placed upon the top of the pipe coupling L and extend between the same and the frame 37 or ring 1 to prevent the elbow or device L being forced out of position. When securely clamped pressure is admitted through the pipe 29, as heretofore described.

What I claim is:

1. In testing apparatus, the combination with a housing, of a cylinder and piston associated therewith, a rest piece engaged by said piston and capable of pivotal motion with respect thereto, and piston retracting means attached to said rest piece.

2. In testing apparatus, the combination with a peripherally closed housing, of a plurality of pressure cylinders associated therewith and having their axes at an angle with each other, pistons for said cylinders, rest pieces associated with said housing and disposed opposite said pistons, and means for retracting said pistons.

3. In testing apparatus, the combination with a housing, of a cylinder supported thereby, a piston for said cylinder, a rest piece engaged by said piston, a member on said rest piece engaged by said piston for affording pivotal contact between said piston and said rest piece, and piston retracting means attached to said rest piece.

4. In testing apparatus, the combination with a housing having a perforation, of a rest piece, a stem thereon adapted to pass freely through said perforation, said rest piece having a depression, a wooden block having an opening, said block fitting in said depression in said rest piece, and a port in said rest piece communicating with the opening in said wooden block.

5. In testing apparatus, the combination with a housing, of a cylinder supported thereby, a piston for said cylinder, a rest piece, a stem thereon, said housing having a perforation adapted to receive said stem, and a distance piece intervening between said rest piece and said housing.

6. In testing apparatus, the combination with a housing, of a rest piece, a stem thereon, said stem engaging said housing to support said rest piece, a distance piece intervening between said rest piece and said housing and having a slot adapted to straddle said stem, and a movable member adapted to thrust a test piece against said rest piece.

7. In testing apparatus the combination with a housing, of a rest piece, a joint forming piece supported by said rest piece and adapted to be engaged by the hollow body under test, a hoop upon said joint forming piece, said joint forming piece having a perforation adapted to communicate with the interior of the hollow body to be tested, said rest piece having an opening communicating with said perforation for admitting pressure exerting agent.

8. In testing apparatus, a circumferentially continuous housing, circumferential stiffening means integral therewith, a cylinder supported by said housing, a rest piece, and a stem thereon, said housing having a perforation adapted to receive said stem.

9. In testing apparatus, the combination with a circumferentially continuous housing, of a plurality of cylinders supported thereby and having their axes at an angle with each other, pistons for said cylinders, rest pieces, said pistons adapted to hold a hollow body to be tested against said rest pieces.

10. In testing apparatus, the combination with a circumferentially continuous housing, of a plurality of cylinders supported thereby and having their axes at an angle with each other, pistons for said cylinders, rest pieces, a hollow body to be tested adapted to be held between said pistons and said rest pieces, and means for admitting pressure agent to said cylinders simultaneously.

11. In testing apparatus, the combination with a housing, of a cylinder supported thereby, rest pieces having their engaging faces at an angle with respect to each other, said rest pieces alined with said cylinder, a support for each of said rest pieces, a piston for said cylinder, said piston adapted to exert pressure upon a member to be tested held between said rest pieces.

In testimony whereof I have hereunto affixed my signature in the presence of the two subscribing witnesses.

WALTER S. BICKLEY.

Witnesses:
HAMLIN T. BEACH,
WILLIAM F. BAKER.